(12) United States Patent
Wang (10) Patent No.: US 12,430,904 B2
(45) Date of Patent: Sep. 30, 2025

(54) METHOD AND SYSTEM FOR OPTIMIZING CONVOLUTIONAL RESIDUAL STRUCTURE OF NEURAL NETWORK, DEVICE, AND MEDIUM

(71) Applicant: INSPUR SUZHOU INTELLIGENT TECHNOLOGY CO., LTD., Jiangsu (CN)

(72) Inventor: Shenling Wang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 310 days.

(21) Appl. No.: 18/039,479

(22) PCT Filed: Sep. 30, 2021

(86) PCT No.: PCT/CN2021/122257
§ 371 (c)(1),
(2) Date: May 30, 2023

(87) PCT Pub. No.: WO2022/121474
PCT Pub. Date: Jun. 16, 2022

(65) Prior Publication Data
US 2024/0096078 A1    Mar. 21, 2024

(30) Foreign Application Priority Data

Dec. 11, 2020    (CN) .......................... 202011453393.3

(51) Int. Cl.
*G06V 10/82*    (2022.01)
*G06V 10/26*    (2022.01)

(52) U.S. Cl.
CPC .............. *G06V 10/82* (2022.01); *G06V 10/26* (2022.01)

(58) Field of Classification Search
CPC ......... G06V 10/48; G06V 10/26; G06V 20/64
See application file for complete search history.

(56) References Cited

U.S. PATENT DOCUMENTS

| 2018/0285715 | A1 | 10/2018 | Son et al. |
| 2019/0147319 | A1* | 5/2019 | Kim ....................... G06N 3/045 |
| | | | 706/15 |

FOREIGN PATENT DOCUMENTS

| CN | 105869117 A | * | 8/2016 | ........... G06T 3/4053 |
| CN | 112633470 A | | 4/2021 | |

OTHER PUBLICATIONS

He, Kaiming, et al. "Deep residual learning for image recognition." Proceedings of the IEEE conference on computer vision and pattern recognition. 2016. (Year: 2016).*

(Continued)

*Primary Examiner* — Ross Varndell
(74) *Attorney, Agent, or Firm* — IPro, PLLC (57) ABSTRACT

Disclosed is a method for optimizing a convolutional residual structure of a neural network, including: obtaining picture data and convolution kernel data of each group of residual structures from a global memory as inputs, calculating a first convolution to obtain a first result, storing the first result in a shared memory; determining the size of a picture according to the picture data of the first result, dividing the picture into a plurality of first regions, allocating a corresponding block to each first region in the shared memory, calculating a second convolution in the blocks to obtain a second result; determining the size of a second picture, dividing the second picture into a plurality of second regions, allocating each second region to a corresponding block, calculating a third convolution in the blocks to obtain an output; adding the output and the inputs and performing linear rectification to obtain a final result.

13 Claims, 5 Drawing Sheets

(56) References Cited

OTHER PUBLICATIONS

Appleyard et al. "Programming Tensor Cores in CUDA 9" pulished Oct. 17, 2017, accessed Jun. 13, 2025, https://developer.nvidia.com/blog/programming-tensor-cores-cuda-9/. (Year: 2017).*

* cited by examiner

METHOD AND SYSTEM FOR OPTIMIZING CONVOLUTIONAL RESIDUAL STRUCTURE OF NEURAL NETWORK, DEVICE, AND MEDIUM

CROSS-REFERENCE TO RELATED APPLICATION

The present disclosure claims priority to Chinese patent application No. 202011453393.3 filed on Dec. 11, 2020 before the CNIPA, China National Intellectual Property Administration, titled "METHOD AND SYSTEM FOR OPTIMIZING CONVOLUTIONAL RESIDUAL STRUCTURE OF NEURAL NETWORK, DEVICE, AND MEDIUM", which is incorporated herein in its entirety by reference.

TECHNICAL FIELD

The present disclosure relates to a method and a system for optimizing convolutional residual structures of a neural network, a computer device, and a computer-readable medium.

BACKGROUND

Residual Network (Resnet) is a convolution neural network with residual structures proposed by Kaiming He et al. in 2015, in which a residual unit is introduced to solve the vanishing gradient problem occurred when a network deepens, with the deepening of layers, the recognition accuracy is improved accordingly; when the network reaches saturation, identity mapping is employed to solve the problem of network degradation on deep layers, and a high image recognition accuracy is obtained. At present, Resnet50 network is widely applied in the field of image recognition.

SUMMARY

An aspect of embodiments of the present disclosure provides a method for optimizing convolutional residual structures of a neural network, including: acquiring picture data of each group of residual structures and convolution kernel data from a global memory to be used as an input of convolution computation, obtaining a first result by computing a first convolution according to the input, and storing the first result in a shared memory; determining a size of a picture according to picture data of the first result, dividing the picture into a plurality of first areas according to the size of the picture, allocating a corresponding block to each of the first areas in the shared memory, and obtaining a second result by computing, according to the first area, a second convolution in the block and the first result; determining a size of a second picture according to the picture data of the second result, dividing the second picture into a plurality of second areas according to the size of the second picture, allocating each of the second areas to a corresponding block, and obtaining an output by computing a third convolution in the block according to the second result and the second area; and obtaining a final result by adding the output to the input and performing a linear rectification, and writing the final result back to the global memory.

Another aspect of embodiments of the present disclosure provides a system for optimizing convolutional residual structures of a neural network, including: a first convolution module, configured to acquire convolution kernel data and picture data of each group of residual structures from a global memory to be used as an input of convolution computation, obtain a first result by computing a first convolution according to the input of convolution computation, and store the first result in a shared memory; a second convolution module, configured to determine a size of a picture according to picture data of the first result, divide the picture into a plurality of first areas according to the size of the picture, allocate a corresponding block to each of the first areas in the shared memory, and obtain a second result by computing, according to the first area, a second convolution in the block; a third convolution module, configured to determine a size of a second picture according to the picture data of the second result, divide the second picture into a plurality of second areas according to the size of the second picture, allocate each of the second areas to a corresponding block, and obtain an output by computing, according to the second area, a third convolution in the block; and an execution module, configured to obtain a final result by adding the output to the input and performing a linear rectification, and write the final result back to the global memory.

Yet another aspect of embodiments of the present disclosure provides a computer device including a memory and one or more processors, and the memory is stored with computer-readable instructions that, when executed by the one or more processors, cause the one or more processors to perform steps of the method described above.

Yet another aspect of embodiments of the present disclosure provides one or more non-volatile computer-readable storage media, and the non-volatile computer-readable storage media is stored with computer-readable instructions that, when executed by one or more processors, cause the one or more processors to perform steps of the method described above.

The details of one or more embodiments of the application are set forth in the accompanying drawings and the description below. Other features and advantages of the present disclosure will be apparent from the description, drawings, and claims.

BRIEF DESCRIPTION OF THE DRAWINGS

To explain the embodiments of the present disclosure or the technical solutions in the related art more clearly, the following will briefly introduce the drawings necessary in the description of the embodiments or the related art; apparently, the drawings in the description below are merely some of rather than all of the embodiments of the present disclosure, and those skilled in the art may obtain other embodiments based on these drawings without making any creative effort.

DETAILED DESCRIPTION

In order that technical solutions and advantages of the present disclosure may be more clearly understood, embodiments of the present disclosure will now be described in further detail, with reference to the accompanying drawings.

It should be noted that all the expressions including "first" and "second" in the embodiments of the present disclosure are used for distinguishing two distinct entities or parameters with the same name. It can be seen that "first" and "second" are merely for the convenience of expressions and should not be understood as limiting the embodiments of the present disclosure, and in the subsequent embodiments, this will not be explained repeatedly.

Resnet50 is a neural network convolution model with a 50-layer computing structure. In this model, most of computations are convolution computations. When the model runs on a graphics processing unit (GPU), the convolution of each layer calls a compute unified device architecture kernel (CUDA Kernel) program for computation. During the computation, the kernel reads data and a weight of the data from a global memory into the kernel, and then a convolution operation is performed in a register or a shared memory; after the computation is completed, the resultant data is written back to the global memory from the register or the shared memory to be used for the convolution operation of the next layer.

In the current GPU architecture, data is read into the shared memory or register from the global memory, or data is written back into the global memory from the shared memory or register, which is a process necessary for calling the CUDA Kernel at present; however, the inventors noticed that this process is defective due to relatively slow communication, and when the core computation of the CUDA Kernel is at a high speed, communication delay becomes a bottleneck for the computation; in this case, the current computation method inevitably results in a frequent reading of data in the global memory during the computation.

Figure 1:
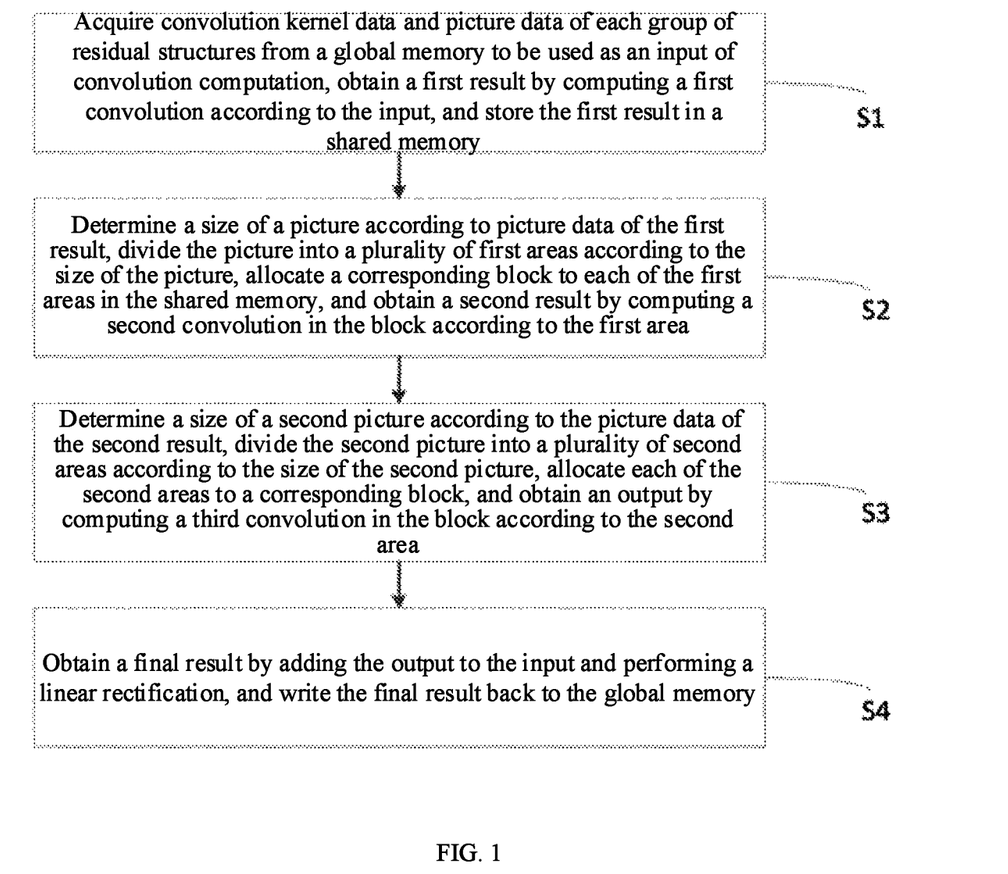
FIG. 1 is a schematic diagram illustrating one or more embodiments of a method for optimizing convolutional residual structures of a neural network provided by the present disclosure.

A first aspect of the present disclosure provides some embodiments of a method for optimizing convolutional residual structures of a neural network. FIG. 1 is a schematic diagram illustrating one or more embodiments of a method for optimizing convolutional residual structures of a neural network according to the present disclosure, and a server is generally taken as an executive subject of the method. As shown in FIG. 1, the embodiments of the present disclosure include steps described below.

At S1, convolution kernel data and picture data of each group of residual structures are acquired from a global memory and used as an input of convolution computation, a first convolution is computed according to the inputs to obtain a first result, and the first result is stored in a shared memory.

At S2, a size of the picture is determined according to picture data of the first result, the picture is divided into a plurality of first areas according to the size of the picture, a corresponding block is allocated to each of the first areas in the shared memory, and a second convolution is computed in the block according to the first area and the first result to obtain a second result.

At S3, a size of a second picture is determined according to the picture data of the second result, the second picture is divided into a plurality of second areas according to the size of the second picture, each of the second areas is allocated to a corresponding block, and a third convolution is computed in the block according to the second result and the second area to obtain an output.

At S4, a final result is obtained by adding the output to the input and performing a linear rectification, and the final result is written back to the global memory.

Figure 2:
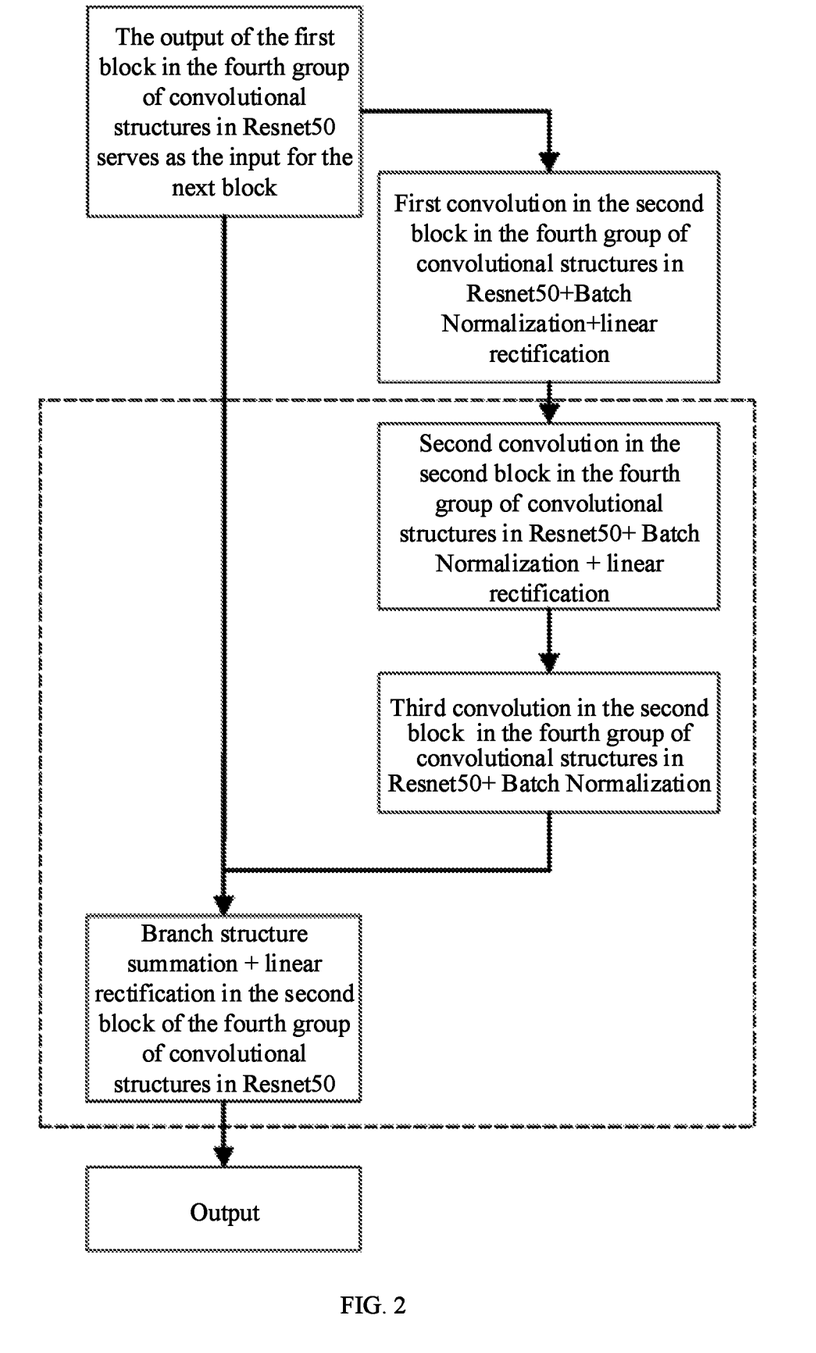
FIG. 2 is a flowchart illustrating computation of a fourth group of residual structures in the related art.
Figure 3:
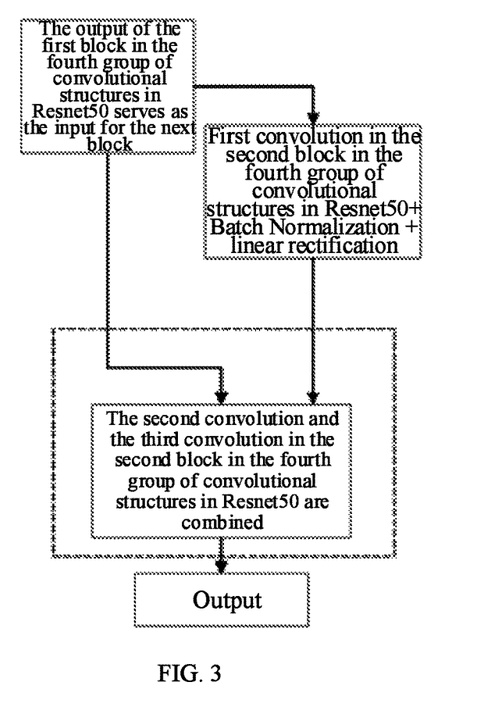
FIG. 3 is a flowchart illustrating an optimized computation of a fourth group of residual structures in one or more embodiments according to the present disclosure.

FIGS. 2 and 3 are comparison schematic diagrams illustrating embodiments of the method for optimizing convolutional residual structures of a neural network provided by the present disclosure and the related art. FIG. 2 is a flowchart of a computation of a fourth group of residual structures in the related art. FIG. 3 is a flowchart of an optimized computation of a fourth group of residual structures in embodiments according to the present disclosure.

As shown in the flowchart of the computation of the fourth group of residual structures in the related art in FIG. 2, an output of Res4.1 (a first block in the fourth group of convolutional structures in the Resnet50 network structure) is taken as an input for the next block, and the input may be the output of an upper-layer convolution of the Res4.1 subjected to Sum (summation) and Relu (linear rectification) processes. This part of data is first transferred to Res4.2conv1 (the first convolution of a second block of the fourth group of convolutional structures in the Resnet50 network structure) on the right side for the computation of the first convolution, i.e., conv1; after subjected to Bn (batch normalization) and Relu (linear rectification), the data is transferred to Res4.2 conv2 (a second convolution of the second block of the fourth group of convolutional structures in the Resnet50 network structure) for the computation of the second convolution, i.e., conv2; next, an output subjected to Bn (batch normalization) and Relu (linear rectification) is transferred to Res4.2conv3 (a third convolution of the second block of the fourth group of convolutional structures in the Resnet50 network structure) for the computation of the third convolution; after subjected to Bn (batch normalization) operation, the data is added to the data of the initial Res4.1 to obtain a corresponding Sum and the Relu (linear rectification) process is made, and thus a complete operation of the convolutional residual structure is performed. There are a total of 16 groups of such residual structures in the Resnet50 network, and the shapes of convolution computation in the residual structures may differ from each other.

As shown in FIG. 3, in the embodiment of the present disclosure, the processes of Conv2, Bn, Relu+Conv3, Bn+Sum, and Relu in the original residual structure, which are a 3*3 convolution (including the affiliated Bn, Relu processes) and a 1*1 convolution (including the affiliated Bn process), are substantially replaced with a combination computation, that is, FuseKernel (Fuse+Kernel, referring to convolution after fuse), in a dotted line box on the right side; moreover, processes of obtaining the Sum with the initial input and the Relu are also combined therein. Through such a combination, the computation of two convolutions and the Sum and Relu processes after the computation may be completed in one Kernel, thereby reducing the number of times the Kernel is called and avoiding two data readings and two data writing back in the global memory. After increasing the computation density in the Kernel and reducing the communication between the data and the global memory, the performance of the network in image recognition may be improved by reasonable design algorithms.

Before describing the present embodiment in detail, the principle of image convolution will be described first. In the field of computer vision, a digital image is a two-dimensional discrete signal, and performing a convolution operation on the digital image is actually a process of sliding a convolution kernel (a convolution template) over the image, multiplying the gray value of a pixel over an image point by the value of a corresponding convolution kernel, adding all the values obtained from the multiplication together as the gray value of the pixel on the image corresponding to the middle pixel of the convolution kernel, and finally sliding over all the images.

Figure 4A:
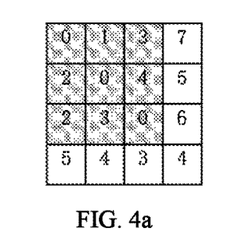
FIG. 4a is an original picture for a convolution computation.
Figure 4B:
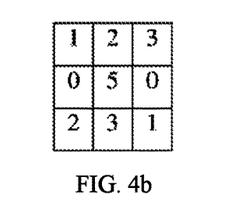
FIG. 4b is a convolution kernel of the convolution computation.
Figure 4C:
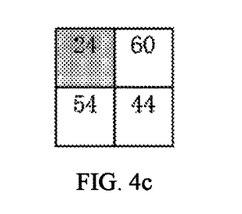
FIG. 4c is a convolution result of the convolution computation.

Image convolution is described according to FIG. 4a, FIG. 4b, and FIG. 4c. FIG. 4a is an original picture for convolution computation, the image size of a product of H (height) and W (width) is 4×4, each number value represents a pixel value; FIG. 4b is a convolution kernel for the convolution computation, which is primarily used for extracting features of a picture, and a size of the convolution kernel is 3×3; FIG. 4c shows a convolution result of the convolution computation. The process of convolution includes sliding the 3×3 convolution kernel shown in FIG. 4b successively over the original picture of FIG. 4a, multiplying the kernel with corresponding pixel points in a 3×3 area of the original picture covered by the kernel, and adding the resultant 9 values together to obtain pixel points of a processed picture. For example, after performing convolution computation in the light-grey area of FIG. 4a, a new pixel point, for example the pixel point in the grey area of FIG. 4c, is obtained, and the original picture is finally processed into the new picture shown in FIG. 4c through the convolution operation. The foregoing are the details of a simple convolution operation. Convolution may highlight the features of the picture and extract the hidden digital information from the picture to achieve the purpose of image classification. In addition, the convolution operation is a main computing process in the convolutional neural network, it is thus necessary to speed up the convolution operation to improve the computing speed of the whole network.

In the embodiment of the present disclosure, an algorithm implementation method is described in detail by taking the third residual structure as an example. Picture data of each group of residual structures and convolution kernel data are acquired from a global memory and used as the input of a convolution computation, a first convolution is computed according to the input to obtain a first result, and the first result is stored in a shared memory. The specific shape of the third residual structure is shown in the table below:

|          | Data:<br>H*W*Ic | Weight:<br>kh*kw*Ic*Oc |    |      | pad | stride |
|----------|-----------------|------------------------|----|------|-----|--------|
| input(1*1) | 14*14*1024   | 1*1*1024*256           | Bn | Relu | 0   | 1      |
| 3*3      | 14*14*256       | 3*3*256*256            | Bn | Relu | 1   | 1      |
| 1*1      | 14*14*256       | 1*1256*1024            | Bn |      | 0   | 1      |

As can be seen from the above, the product of the height (H) and width (W) of the shape of data of each of the two convolutions combined is 14*14; in the first convolution, the number of input channels (Ic) of the data is 1024, the product of the height (kh) and width (kw) of the weight is 1*1, the number of input channels (Ic) of the weight is 1024, the number of output channels (Oc) of the weight is 256, and Bn and Relu operations need to be performed after the convolution, the pad is 0 and the stride is 1 in the convolution process; and the detailed data about the 3*3 convolution and the last 1*1 convolution may be obtained from the above table.

The size of a picture is determined according to picture data of the first result, the picture is divided into a plurality of first areas according to the size of the picture, a corresponding block is allocated to each of the first areas in the shared memory, and a second convolution is computed in the block according to the first area and the first result to obtain a second result.

Figure 5:
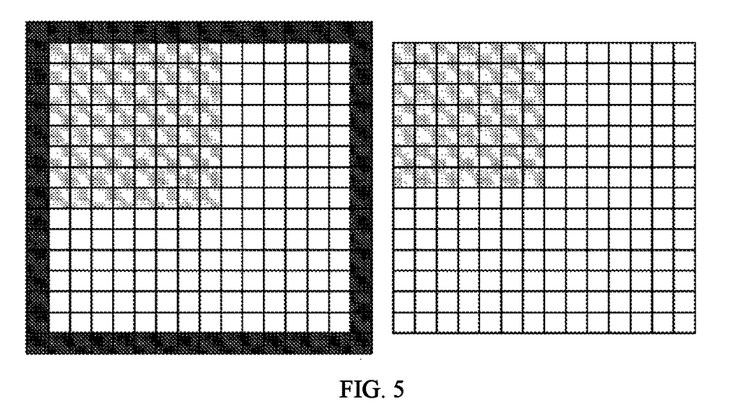
FIG. 5 is a schematic diagram illustrating a computation process of a second convolution.

FIG. 5 is a schematic diagram illustrating the computation process of the second convolution, and the first area is a dark area on the left side of FIG. 5. The left graph in FIG. 5 shows the input data for a 3*3 convolution, and the right graph in FIG. 5 shows the output data of the 3*3 convolution. As can be seen from the above table, the product of the height and width of a picture is 16*16 (after padding), and each point in FIG. 5 represents that the input channel is 256; in the embodiment of the present disclosure, for one picture, the area of 16*16 is divided into four 9*9 areas, and the four 9*9 areas are allocated to four blocks respectively; in the areas where the four blocks govern, adjacent blocks have two overlapping rows or columns. Thus, the computation of the data in the left graph of FIG. 5 in a block results in the light-colored areas in the right graph of FIG. 5, which are the output of the 3*3 convolution and also the input for the last 1*1 convolution.

In some embodiments, the second result is obtained by computing the second convolution in the block according to the first area as follows: performing a plurality of sliding window operations in the first area to obtain the second result.

In some embodiments, performing a plurality of sliding window operations in the first areas to obtain the second result includes: performing a plurality of sliding window operations, and obtaining the second result by accumulating convolution results derived from each sliding window operation in the plurality of sliding window operations, where each sliding window operation includes: obtaining, through a sliding window, a picture convolution area to be computed each time in the first area, and obtaining a convolution computation result by performing a matrix multiplication operation on the picture convolution compu­tation area and corresponding data of a convolution kernel.

Different from the first 1*1 convolution, the operation performed in the 3*3 convolution is a sliding window operation in nine (i.e., 3*3) point areas, hence each time of computation, a 9*9 area needs to be padded as a 10*10 area, and then the sliding window operation is performed in the 10*10 area; each time, an 8*8 area is taken from the 10*10 area for a convolution operation; the results of each sliding window operation are accumulated in the same area; after nine times of sliding window operations, the output of the 3*3 convolution is obtained.

For each sliding window operation, the data matrix m*k is 64(H*W)*256(Ic), and the matrix n*k formed from corresponding weights is 256(Oc)*256(Ic), hence the convolution output matrix m*n obtained by multiplying the two matrices of the data and the weight is 64(H*W)*256(Oc), and finally the computation of the convolution is completed.

The size of a second picture is determined according to the picture data of the second result, the second picture is divided into a plurality of second areas according to the size of the second picture, each of the second areas is allocated to a corresponding block, and a third convolution is computed in the block according to the second result and the second area to obtain an output.

Figure 6:
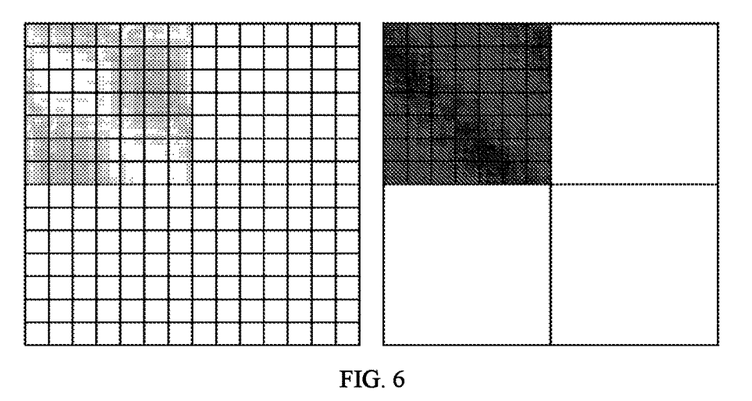
FIG. 6 is a diagram illustrating a computation process of a third convolution.

FIG. 6 is a schematic diagram illustrating a computation process of the third convolution, and the second area is a dark area on the left side of FIG. 6. The left graph of FIG. 6 shows the input data of a 1*1 convolution, and the right graph of FIG. 6 shows the output data of the 1*1 convolution. As can be seen from the above table, the product of the height and width of a picture is 14*14, and each point in the figure represents that the input channel is 256. In the embodiment of the present disclosure, the area of 14*14 of one picture is divided into four 7*7 areas, and the four 7*7 areas are allocated to four blocks respectively. Thus, the computation of the dark-colored data in the left graph of FIG. 6 in a block results in the light-colored areas in the right graph of FIG. 6, which are the output of the 1*1 convolution.

In the computation of the last 1*1 convolution, to adapt to the computation of the matrix multiply-accumulate (MMA), each 7*7 area needs to be padded as an 8*8 area in the shared memory, hence a two-dimensional matrix of 64 rows and 256 columns is formed in the 8*8 area computed in one block in the left graph of FIG. 6. That is, the data matrix m*k is 64(H*W)*256(Ic); the matrix n*k formed by corresponding weights is 1024(Oc)*256(Ic), hence the convolution output matrix m*n obtained by multiplying the two matrices of the data and the weight is 64(H*W)*1024(Oc), and finally the computation of convolution is completed.

The final result is obtained by adding the output to the input and performing a linear rectification, and the final result is written back to the global memory. After the convolution operation is completed, the required 7*7 area is extracted and, together with the input data for the first 1*1 convolution, subjected to the Sum and Relu processes, and then the data is written back to the global memory to complete the operations of the whole convolution combination.

In some embodiments, the method further includes: setting a shape of the matrix multiplication in the block and comparing the shape of the matrix multiplication with a shape of an MMA matrix multiplication to obtain a number of times of MMA operations; and acquiring a number of threads in the block and allocating the number of times of the MMA operations according to the number of threads.

In the above-mentioned computation process of each convolution, a matrix multiplication needs to be performed. In order to implement an efficient matrix multiplication algorithm in CUDA, the embodiment of the present disclosure directly implements the matrix multiplication by using a ptx instruction of MMA in Tensorcore, and the operation performed by each MMA is an m8n8k16 matrix multiplication. To adapt to the shared memory, the embodiment of the present disclosure specifies the shape m*n*k of the matrix multiplication in a block as 64*256*64 so that each time of matrix multiplication, the whole convolution operation may be completed through cycles of n in the k direction. By comparing the shape of the matrix multiplication in the block with the shape of the mma matrix multiplication, it may be obtained that in each block, a total of 8*32 MMA operations need to be performed, where each computation needs four cycles in the k direction; the number of threads is set to be 256 in each block, i.e., 8 warps; the 8*32 MMA instruction operations are divided into 8 warps, each warp computing 8*4 MMA matrix multiplications. An efficient matrix multiplication operation is achieved by dividing the MMA into a plurality of threads for computation.

The embodiment of the present disclosure is based on the Tensorcore computation core on CUDA and performs combined computation on the residual structures in Resnet50, so as to improve the performance of the model at runtime and speed up the computation of the model in deep learning-based image recognition and reasoning.

The method disclosed in the above-mentioned embodiments may divide different pictures into first areas and second areas according to the size of the picture, and the result of the first area may still be used for the second area, so that two convolutions may be performed in the shared memory, thereby reducing the number of data exchanges between the global memory and the shared memory and improving the efficiency of the operation.

It should be noted that the steps in the embodiments of the above-mentioned method for optimizing convolutional residual structures of a neural network may be interleaved and replaced with each other, and added to or deleted from one another; therefore, such rearrangement and changes of the method for optimizing convolutional residual structures of a neural network shall also fall within the scope of protection of the present disclosure, and the scope of protection of the present disclosure shall not be limited to these embodiments.

It should be understood that, although the steps in the flowcharts of FIGS. 1 to 3 are shown sequentially as indicated by the arrows, these steps are not necessarily performed sequentially in the order indicated by the arrows. The steps are performed in no strict order unless explicitly stated herein, and the steps may be performed in other orders. Moreover, at least a portion of the steps in FIGS. 1 to 3 may include a plurality of sub-steps or stages that are not necessarily performed at the same time, but may be performed at different times, and the order in which the sub-steps or stages are performed is not necessarily sequential, but may be in turn or in alternation with at least a portion of other steps or sub-steps or stages of other steps.

Figure 7:
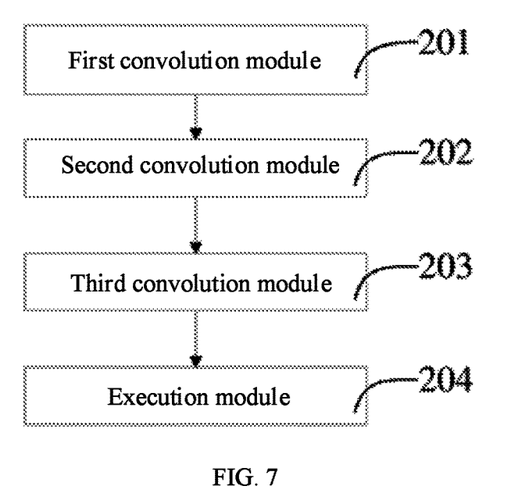
FIG. 7 is a schematic diagram illustrating one or more embodiments of a system for optimizing convolutional residual structures of a neural network provided by the present disclosure.

A second aspect of the embodiments of the present disclosure provides a system for optimizing convolutional residual structures of a neural network. As shown in FIG. 7, the system includes: a first convolution module 201, configured to acquire convolution kernel data and picture data of each group of residual structures from a global memory to be used as an input of convolution computation, obtain a first result by computing a first convolution according to the input, and store the first result in a shared memory; a second convolution module 202, configured to determine a size of a picture according to picture data of the first result, divide the picture into a plurality of first areas according to the size of the picture, allocate a corresponding block to each of the first areas in the shared memory, and obtain a second result by computing, according to the first area, a second convolution in the block and the first result; a third convolution module 203, configured to determine a size of a second picture according to the picture data of the second result, divide the second picture into a plurality of second areas according to the size of the second picture, allocate each of the second areas to a corresponding block, and obtain an output by computing a third convolution in the block according to the second result and the second area; and an execution module 204, configured to obtain a final result by adding the output to the input and performing a linear rectification, and write the final result back to the global memory.

In some embodiments, the second convolution module is configured to: obtain the second result by performing a plurality of sliding window operations in the first area.

In some embodiments, the second convolution module is configured to: perform a plurality of sliding window operations, and obtain the second result by accumulating convolution results derived from each sliding window operation in the plurality of sliding window operations, where each sliding window operation includes: obtaining, through a sliding window, picture convolution area to be computed each time in the first area, and obtaining the convolution result by performing a matrix multiplication operation on the picture convolution computation area and corresponding data of a convolution kernel.

In some embodiments, the system further includes: a computing module, configured to: set a shape of the matrix multiplication in the block and compare the shape of the matrix multiplication with a shape of an MMA matrix multiplication to obtain a number of times of MMA operations; and acquire a number of threads in the block and allocate the number of times of the MMA operations according to the number of threads.

A third aspect of the embodiments of the present disclosure provides a computer device, including a memory and one or more processors, where the memory stores computer-readable instructions that, when executed by the processors, cause the one or more processors to perform the steps of: S1, acquiring convolution kernel data and picture data of each group of residual structures from a global memory to be used as an input of convolution computation, obtaining a first result by computing a first convolution according to the input, and storing the first result in a shared memory; S2, determining a size of a picture according to picture data of the first result, dividing the picture into a plurality of first areas according to the size of the picture, allocating a corresponding block to each of the first areas in the shared memory, and obtaining a second result by computing, according to the first area, a second convolution in the block and the first result; S3, determining a size of a second picture according to the picture data of the second result, dividing the second picture into a plurality of second areas according to the size of the second picture, allocating each of the second areas to a corresponding block, and obtaining an output by computing a third convolution in the block according to the second result and the second area; and S4, obtaining a final result by adding the output to the input and performing a linear rectification, and writing the final result back to the global memory.

In some embodiments, when the processor executes the computer-readable instructions to implement the above-mentioned step of obtaining a second result by computing, according to the first area, a second convolution in the block, the processor executes the following step: obtaining the second result by performing a plurality of sliding window operations in the first areas.

In some embodiments, when the processor executes the computer-readable instructions to implement the above-mentioned step of obtaining the second result by performing a plurality of sliding window operations in the first area, the processor executes the following steps of: performing a plurality of sliding window operations, and obtaining the second result by accumulating convolution results derived from each sliding window operation in the plurality of sliding window operations, where each sliding window operation includes: obtaining, through a sliding window, a picture convolution area to be computed each time in the first areas, and obtaining the convolution result by performing a matrix multiplication operation on the picture convolution area and data corresponding to a convolution kernel.

In some embodiments, the processor, when executing the computer-readable instructions, further performs the steps of: setting a shape of the matrix multiplication in the block and comparing the shape of the matrix multiplication with a shape of an MMA matrix multiplication so as to obtain a number of times of MMA operations; and acquiring a number of threads in the block and allocating the number of times of the MMA operations according to the number of threads.

Figure 8:
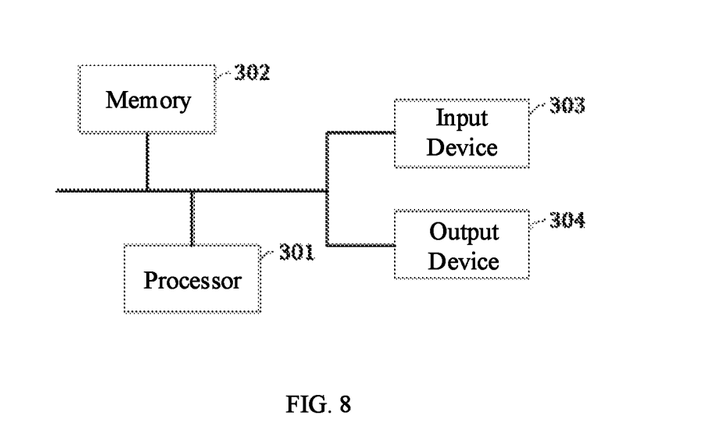
FIG. 8 is a schematic diagram illustrating a hardware configuration of one or more embodiments of a computer device for optimizing convolutional residual structures of a neural network provided by the present disclosure.

As shown in FIG. 8, a schematic diagram illustrating a hardware architecture of an embodiment of the computer device for optimizing convolutional residual structures of a neural network described above is shown.

Taking the device shown in FIG. 8 as an example, the device includes a processor 301 and a memory 302 and may further include an input device 303 and an output device 304.

The processor 301, the memory 302, the input device 303, and the output device 304 may be connected via a bus or in other ways, the connection via a bus being exemplified in FIG. 8.

The memory 302 is a non-volatile computer-readable storage medium that may be used to store non-volatile software programs, non-volatile computer-executable programs, and modules, such as program instructions/modules corresponding to the method for optimizing convolutional residual structures of a neural network in the embodiments of the present disclosure. The processor 301 implements various functional applications of the server and data processing by running non-volatile software programs, instructions, and modules stored in the memory 302, that is, implements the method for optimizing convolutional residual structures of a neural network in the embodiments described above.

The memory 302 may include a program storage partition and a data storage partition, where the program storage partition may store an operating system, an application program required by at least one function, and computer-readable instructions; the data storage partition may store data created according to the use of the method for optimizing convolutional residual structures of a neural network, etc. In addition, the memory 302 may include a high-speed random-access memory and may also include a non-volatile memory, such as at least one magnetic disk storage device, flash memory device, or other non-volatile solid-state storage device. In some embodiments, the memory 302 may optionally include a memory remotely located with respect to the processor 301, which may be connected to a local module via a network. Examples of such a network include, but are not limited to, the Internet, intranets, local area networks, mobile communication networks, and combinations thereof.

The input device 303 may receive information such as an input username and password. The output device 304 may include a display such as a screen.

The memory 302 is stored with one or more program instructions/modules corresponding to the method for optimizing convolutional residual structures of a neural network, that, when executed by the processor 301, perform the method for optimizing convolutional residual structures of a neural network in any of the method embodiments described above.

Any embodiment of a computer device implementing the above-described method for optimizing convolutional residual structures of a neural network may achieve the same or similar effects as any of the above-described method embodiments corresponding thereto.

The present disclosure further provides one or more non-volatile computer-readable storage media storing computer-readable instructions that, when executed by one or more processors, cause the one or more processors to perform the steps of the method of the above embodiments.

Finally, it should be noted that those skilled in the art can understand that all or part of the processes in the methods of the above embodiments can be implemented by instructing related hardware through computer-readable instructions. The readable instructions of the method for optimizing convolutional residual structures of a neural network can be stored in a computer-readable storage medium, and the readable instructions, when executed, can include the processes of the embodiments of the above-mentioned methods. The storage medium of the readable instructions may be a magnetic disk, an optical disk, a read-only memory (ROM) or a random access memory (RAM). The above embodiments of computer-readable instructions can achieve the same or similar effect as any of the above-mentioned method embodiments.

The above are exemplary embodiments of the present disclosure, but it should be noted that various changes and modifications can be made without departing from the scope of the embodiments of the present disclosure defined in the claims. The functions, steps and/or actions of the method claims in accordance with the disclosed embodiments described herein need not be performed in any particular order. In addition, although the elements disclosed in the embodiments of the present disclosure may be described or claimed in an individual form, they may also be understood as multiple unless explicitly limited to be a singular number.

It should be understood that as used herein, the singular form "a" and "an" are intended to include the plural forms as well, unless the context clearly supports an exception. It should also be understood that "and/or" as used herein is meant to include any and all possible combinations of one or more of the associated listed items.

The serial numbers of the embodiments disclosed in the above-mentioned embodiments are only for description, and do not represent the advantages and disadvantages of the embodiments.

Those skilled in the art can understand that all or part of the steps for implementing the above-mentioned embodiments can be completed by hardware, or by instructing related hardware based on computer-readable instructions. The computer-readable instructions can be stored in a non-volatile computer-readable storage medium, and the storage medium may be a read-only memory, a magnetic disk or an optical disk, and the like.

Those skilled in the art should understand that the discussion of any of the above embodiments is exemplary only, and is not intended to imply that the scope (including claims) of the embodiments of the present disclosure is limited to these examples. Under the idea of the embodiments of the present disclosure, the technical features in the above embodiments or different embodiments can also be combined, and there are many other changes in different aspects of the above embodiments of the present disclosure, which are not provided in details for the sake of brevity. Therefore, within the spirit and principle of the embodiments of the present disclosure, any omissions, modifications, equivalent replacements, improvements, etc., shall be included in the protection scope of the embodiments of the present disclosure.

The invention claimed is:

1. A method for optimizing convolutional residual structures of a neural network, comprising:
   acquiring convolution kernel data and picture data of each group of residual structures from a global memory to be used as an input of convolution computation, obtaining a first result by computing a first convolution according to the input, and storing the first result in a shared memory;
   determining a size of a picture according to picture data of the first result, dividing the picture into a plurality of first areas according to the size of the picture, allocating a corresponding block to each of the first areas in the shared memory, and obtaining a second result by computing, according to each said first area, a second convolution in the corresponding said block;
   determining a size of a second picture according to the picture data of the second result, dividing the second picture into a plurality of second areas according to the size of the second picture, allocating each of the second areas to a corresponding block, and obtaining an output by computing, according to each said second area, a third convolution in the corresponding said block; and
   obtaining a final result by adding the output to the input and performing a linear rectification, and writing the final result back to the global memory;
   wherein the obtaining the second result by computing, according to each said first area, the second convolution in the corresponding block comprises: obtaining the second result by performing a plurality of sliding window operations in each said first area;
   wherein the obtaining the second result by performing a plurality of sliding window operations in each said first area comprises: performing the plurality of sliding window operations, and obtaining the second result by accumulating convolution computation results derived from each sliding window operation in the plurality of sliding window operations, wherein each sliding window operation comprises: obtaining, through a sliding window, a picture convolution computation area to be computed each time in each said first area, and obtaining a convolution computation result by performing a matrix multiplication operation on the picture convolution computation area and corresponding data of the convolution kernel;
   wherein the dividing the picture into a plurality of first areas according to the size of the picture comprises dividing a picture of 16*16 into four 9*9 areas, and the allocating a corresponding block to each of the first areas in the shared memory comprises allocating the four 9*9 areas to four blocks respectively.

2. The method according to claim 1, wherein the performing the plurality of sliding window operations comprises: padding each said 9*9 area to be a 10*10 area, and performing the sliding window operation in the 10*10 area.

3. The method according to claim 2, wherein the obtaining a convolution computation result by performing a matrix multiplication operation on the picture convolution computation area and corresponding data of the convolution kernel comprises: taking an 8*8 area from the 10*10 area for a convolution operation, accumulating results of each sliding window operation in a same area.

4. The method according to claim 1, wherein the dividing the second picture into a plurality of second areas according to the size of the second picture comprises dividing the second picture of 14*14 into four 7*7 areas, and the allocating each of the second areas to a corresponding block comprises allocating the four 7*7 areas to the four blocks respectively.

5. The method according to claim 4, wherein the obtaining an output by computing, according to each said second area, a third convolution in the corresponding said block comprises padding each of the four 7*7 area to be an 8*8 area in the shared memory.

6. The method according to claim 1, further comprising:
setting a shape of matrix multiplication in the corresponding said block, and comparing the shape of the matrix multiplication with a shape of a matrix multiply-accumulate (MMA) matrix multiplication to obtain a number of times of MMA operations; and
acquiring a number of threads in the corresponding said block, and allocating the number of times of the MMA operations according to the number of threads.

7. A computer device comprising a memory and one or more processors, wherein the memory is stored with computer-readable instructions that, when executed by the one or more processors, cause the one or more processors to perform operations of:
acquiring convolution kernel data and picture data of each group of residual structures from a global memory to be used as an input of convolution computation, obtaining a first result by computing a first convolution according to the input, and storing the first result in a shared memory;
determining a size of a picture according to picture data of the first result, dividing the picture into a plurality of first areas according to the size of the picture, allocating a corresponding block to each of the first areas in the shared memory, and obtaining a second result by computing, according to each said first area, a second convolution in the corresponding said block;
determining a size of a second picture according to the picture data of the second result, dividing the second picture into a plurality of second areas according to the size of the second picture, allocating each of the second areas to a corresponding block, and obtaining an output by computing, according to each said second area, a third convolution in the corresponding said block; and
obtaining a final result by adding the output to the input and performing a linear rectification, and writing the final result back to the global memory;
wherein the obtaining the second result by computing, according to each said first area, the second convolution in the corresponding block comprises: obtaining the second result by performing a plurality of sliding window operations in each said first area;
wherein the obtaining the second result by performing a plurality of sliding window operations in each said first area comprises: performing the plurality of sliding window operations, and obtaining the second result by accumulating convolution computation results derived from each sliding window operation in the plurality of sliding window operations, wherein each sliding window operation comprises: obtaining, through a sliding window, a picture convolution computation area to be computed each time in each said first area, and obtaining a convolution computation result by performing a matrix multiplication operation on the picture convolution computation area and corresponding data of the convolution kernel;
wherein the dividing the picture into a plurality of first areas according to the size of the picture comprises dividing a picture of 16*16 into four 9*9 areas, and the allocating a corresponding block to each of the first areas in the shared memory comprises allocating the four 9*9 areas to four blocks respectively.

8. The computer device according to claim 7, wherein the performing the plurality of sliding window operations comprises: padding each said 9*9 area to be a 10*10 area, and performing the sliding window operation in the 10*10 area.

9. The computer device according to claim 8, wherein the obtaining a convolution computation result by performing a matrix multiplication operation on the picture convolution computation area and corresponding data of the convolution kernel comprises: taking an 8*8 area from the 10*10 area for a convolution operation, accumulating results of each sliding window operation in a same area.

10. The computer device according to claim 7, wherein the dividing the second picture into a plurality of second areas according to the size of the second picture comprises dividing the second picture of 14*14 into four 7*7 areas, and the allocating each of the second areas to a corresponding block comprises allocating the four 7*7 areas to the four blocks respectively.

11. The computer device according to claim 10, wherein the obtaining an output by computing, according to each said second area, a third convolution in the corresponding said block comprises padding each of the four 7*7 area to be an 8*8 area in the shared memory.

12. The computer device according to claim 7, wherein the one or more processors are further configured to perform operations of:
setting a shape of matrix multiplication in the corresponding said block, and comparing the shape of the matrix multiplication with a shape of a matrix multiply-accumulate (MMA) matrix multiplication to obtain a number of times of MMA operations; and
acquiring a number of threads in the corresponding said block, and allocating the number of times of the MMA operations according to the number of threads.

13. A non-transient computer-readable storage media, wherein the non-transient computer-readable storage media is stored with computer-readable instructions that, when executed by one or more processors, cause the one or more processors to perform operations of:
acquiring convolution kernel data and picture data of each group of residual structures from a global memory to be used as an input of convolution computation, obtaining a first result by computing a first convolution according to the input, and storing the first result in a shared memory;
determining a size of a picture according to picture data of the first result, dividing the picture into a plurality of first areas according to the size of the picture, allocating a corresponding block to each of the first areas in the shared memory, and obtaining a second result by computing, according to each said first area, a second convolution in the corresponding said block;
determining a size of a second picture according to the picture data of the second result, dividing the second picture into a plurality of second areas according to the size of the second picture, allocating each of the second areas to a corresponding block, and obtaining an output by computing, according to each said second area, a third convolution in the corresponding said block; and
obtaining a final result by adding the output to the input and performing a linear rectification, and writing the final result back to the global memory;
wherein the obtaining the second result by computing, according to each said first area, the second convolution in the corresponding block comprises: obtaining the second result by performing a plurality of sliding window operations in each said first area;

wherein the obtaining the second result by performing a plurality of sliding window operations in each said first area comprises: performing the plurality of sliding window operations, and obtaining the second result by accumulating convolution computation results derived from each sliding window operation in the plurality of sliding window operations, wherein each sliding window operation comprises: obtaining, through a sliding window, a picture convolution computation area to be computed each time in each said first area, and obtaining a convolution computation result by performing a matrix multiplication operation on the picture convolution computation area and corresponding data of the convolution kernel;

wherein the dividing the picture into a plurality of first areas according to the size of the picture comprises dividing a picture of 16*16 into four 9*9 areas, and the allocating a corresponding block to each of the first areas in the shared memory comprises allocating the four 9*9 areas to four blocks respectively.

* * * * *